United States Patent [19]

Fike, Jr.

[11] 4,426,109
[45] Jan. 17, 1984

[54] SHEAR TYPE PRESSURE RELIEF DEVICE FOR HYDRAULIC ENERGY ABSORPTION UNIT

[75] Inventor: Lester L. Fike, Jr., Blue Springs, Mo.

[73] Assignee: Fike Metal Products Corporation, Blue Springs, Mo.

[21] Appl. No.: 296,206

[22] Filed: Aug. 25, 1981

Related U.S. Application Data

[63] Continuation-in-part of Ser. No. 285,292, Jul. 20, 1981, abandoned.

[51] Int. Cl.$^3$ .......................... A47C 7/14; F16F 1/00; F16F 3/00
[52] U.S. Cl. .................................. 293/133; 137/68 R; 188/289; 188/317; 188/376; 267/64.15; 267/139; 267/116
[58] Field of Search ............... 267/8 A, 116, 139–140, 267/64.22, 64.18, 64.26, 64.15; 293/107, 118, 132, 133, 134, 110, 1; 188/375, 371, 376, 269, 289, 312, 321.11, 317; 137/71, 68 R, 67, 797, 860, 505.11, 508, 69

[56] References Cited

U.S. PATENT DOCUMENTS

| | | | |
|---|---|---|---|
| 1,779,065 | 10/1930 | Grant | 137/69 |
| 2,128,039 | 8/1938 | Cibulka | 137/69 |
| 3,205,909 | 9/1965 | Oldfield | 137/797 X |
| 3,362,742 | 1/1968 | Sanderson | 188/375 X |
| 3,700,273 | 10/1972 | Jackson et al. | 293/134 |
| 3,820,771 | 6/1974 | Kerr et al. | 293/134 X |
| 3,968,862 | 7/1976 | Gorges et al. | 293/133 X |
| 4,003,454 | 1/1977 | Wössner | 293/134 X |
| 4,045,009 | 8/1977 | Pees | 293/134 X |
| 4,054,311 | 10/1977 | Gute | 293/134 |

Primary Examiner—Douglas C. Butler
Attorney, Agent, or Firm—Schmidt, Johnson, Hovey & Williams

[57] ABSTRACT

An improved shear-type pressure relief device is provided which is useful in conjunction with pressure chambers requiring relief when system pressures exceed a predetermined level, such as in the shock absorbing piston and cylinder assemblies of present day vehicle bumpers. The relief device is preferably in the form of an integral, metallic body including a flange in engagement with a pressure chamber wall adjacent a relief opening, with a projection extending into the opening. The juncture between the flange and projection is advantageously very sharp (having a radius of less than about 0.020 inches) and the device is designed to shear upon experiencing high system pressures for relief purposes. In the case of vehicle bumpers the shear device is located on the shiftable, bumper-mounted piston thereof, and circumscribes the usual stationary, tapered, frame-mounted, flow-restricting rod. In this manner the normal operation of the bumper under moderate impact loads remains unaffected, whereas in the case of high impact loads the system pressures shear the device and provide a degree of shock absorption not found in conventional bumpers.

23 Claims, 25 Drawing Figures

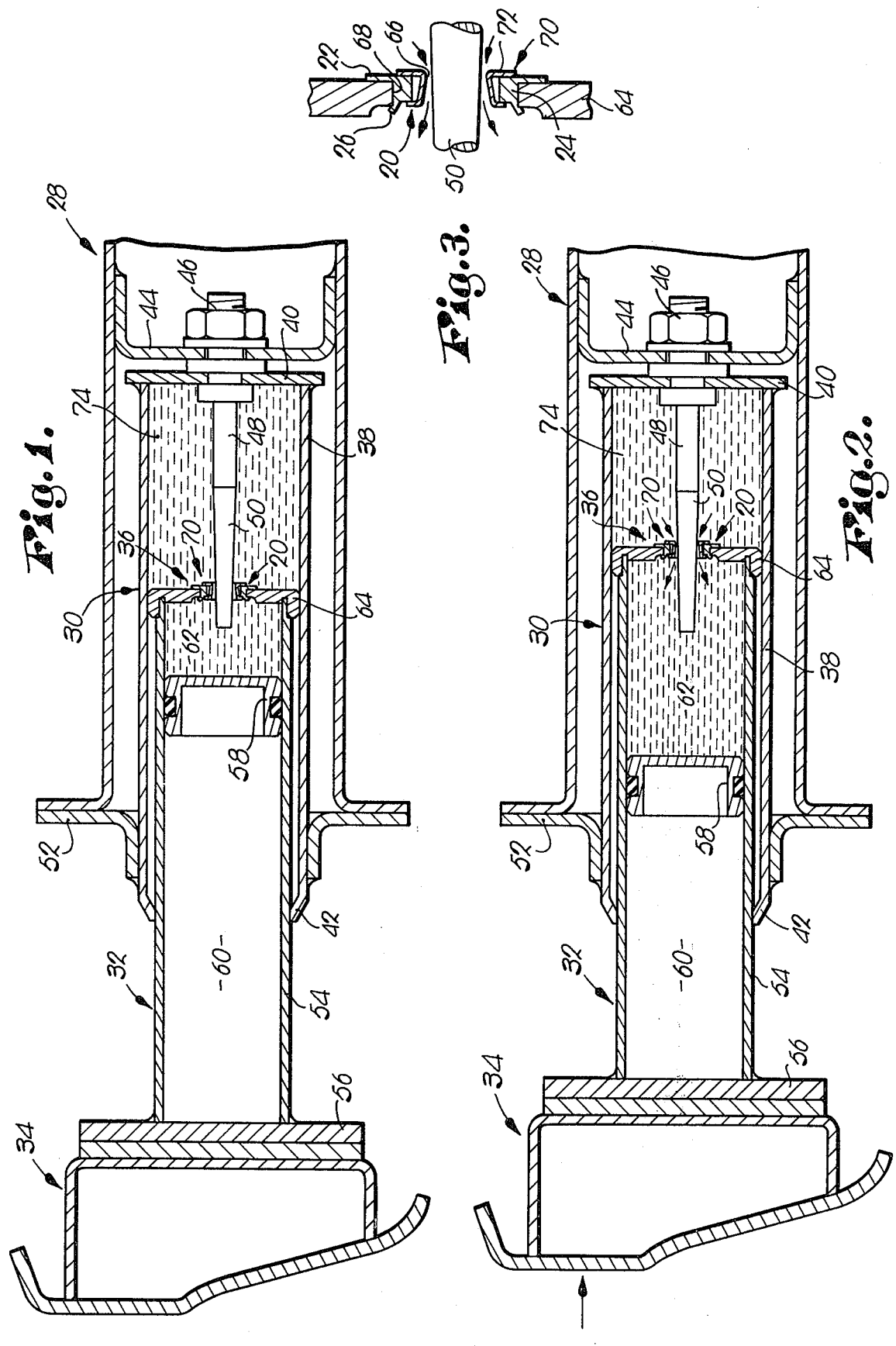

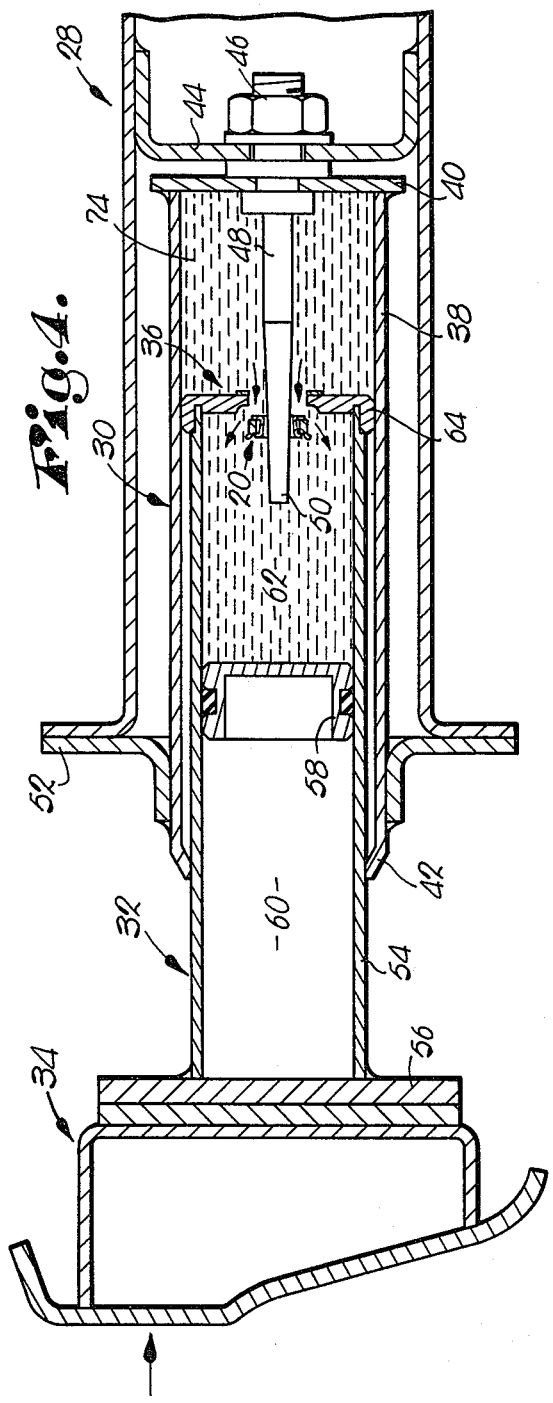
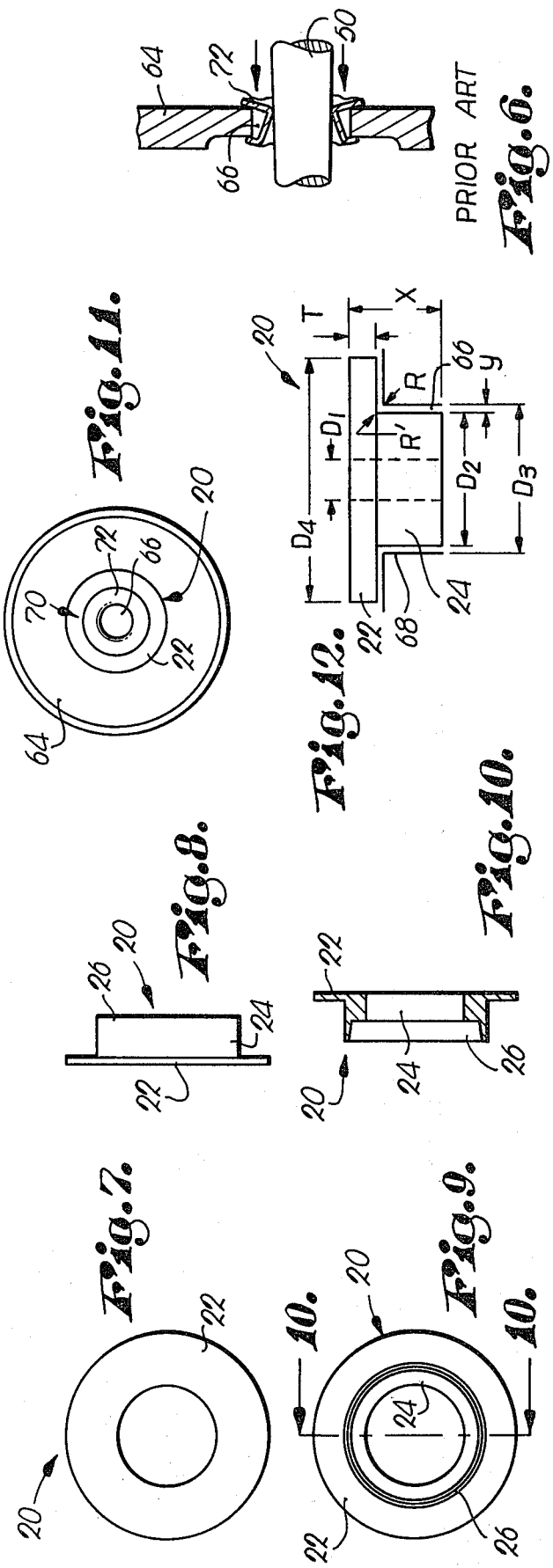

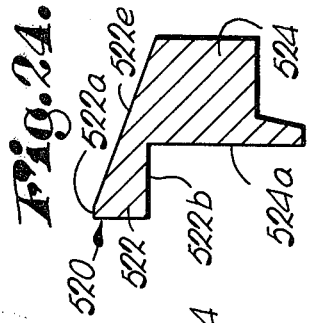
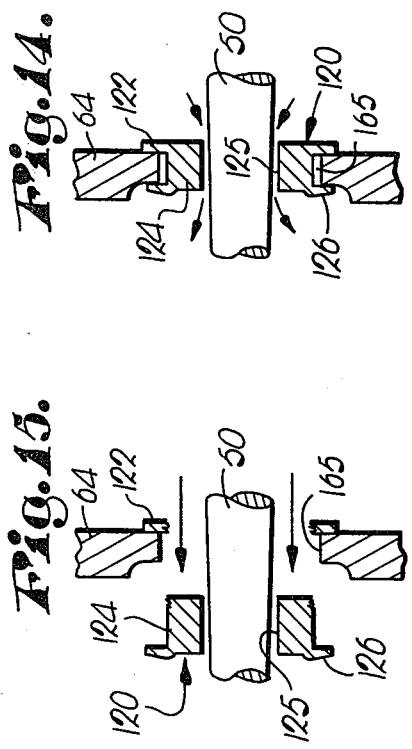
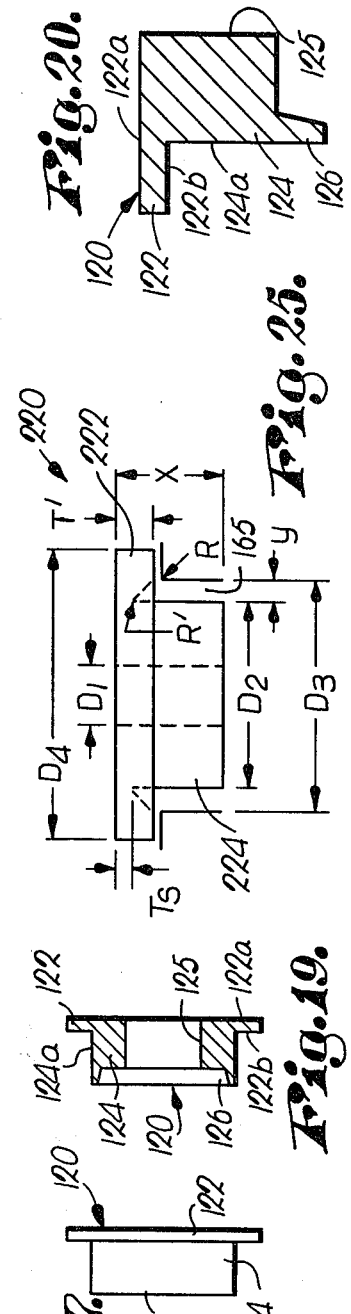
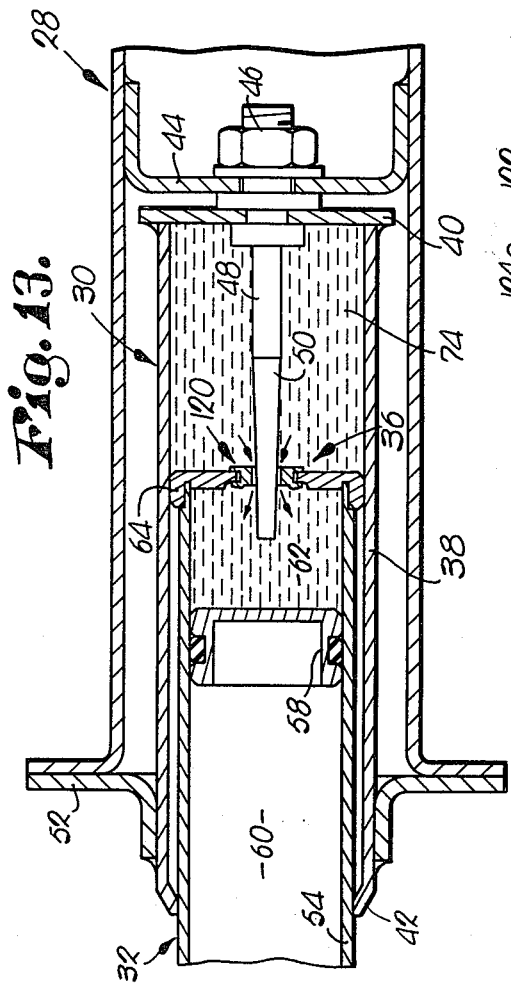
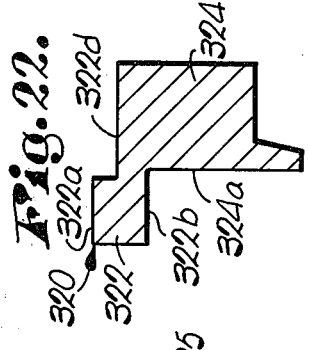
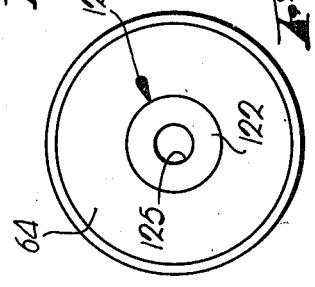
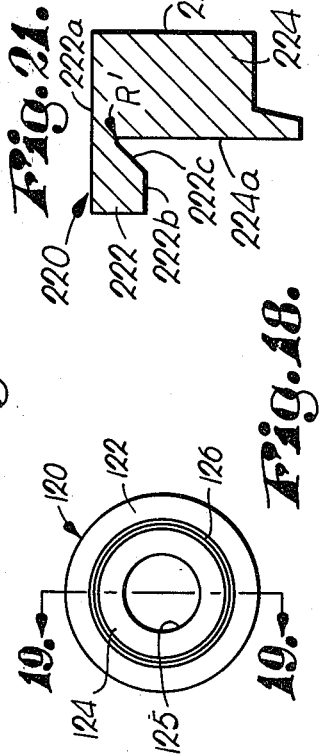

SHEAR TYPE PRESSURE RELIEF DEVICE FOR HYDRAULIC ENERGY ABSORPTION UNIT

RELATED APPLICATION

This application is a continuation in part of my application, Ser. No. 285,292 filed July 20, 1981, now abandoned, under the same title.

BACKGROUND OF THE INVENTION

1. Field of the Invention

The present invention is broadly concerned with a fluid system equipped with a shear-type relief device especially designed for shearing when system pressures exceed a predetermined level. More particularly, it is concerned with such a fluid system, such as found in shock-absorbing bumpers, where the shear-type relief device is capable of allowing fluid bleed therethrough under low pressure conditions but is operable under very high pressures to provide full pressure relief where prior devices have failed under these operating parameters.

2. Description of the Prior Art

Under existing governmental regulations, automobiles must be provided with shock absorbing bumpers which are capable of sustaining an impact of up to five miles per hour against a stationary object without bumper damage. One such bumper in widespread use includes, for each bumper, a pair of forwardly projecting fluid cylinders fixedly secured to the vehicle frame, as well as corresponding tubular pistons secured to the bumper and telescopically received by the cylinders. The pistons are equipped with a slidable seal intermediate the ends thereof, as well as an apertured, innermost cap. Pressurized gas (e.g., nitrogen) is located in a chamber between the bumper and piston seal, whereas a hydraulic fluid in liquid form is provided within the remainder of the piston and the cylinder, communication between these regions being established via the cap aperture. In addition, an elongated, tapered central rod is located within the cylinder and extends through the cap aperture into the tubular piston. An oppositely tapered grommet presenting an orifice is located within the cap aperture in circumscribing relationship to the stationary rod.

When a vehicle having a shock absorbing bumper of the above type strikes an object, the pistons telescope into the corresponding cylinders, with the effect that the pistons shift along the length of the corresponding rods and the pressure of the hydraulic fluid is increased. An additional quantity of fluid is thus caused to pass from the cylinder into the piston through the central cap aperture, which in turn shifts the internal piston seal and compresses the gaseous material within the forward chamber. Flow of fluid through the restricted orifice and compression of the gaseous material creates a shock-absorbing resistance and thus prevents damage to the bumper.

While bumpers of the type described are indeed capable of withstanding impact loads of low or moderate magnitude, under high impact loads they typically fail and contribute to the possibility of intrusion of components of the vehicle itself into the passenger compartment thereby increasing the potential of occupant injury. This occurs under high impact pressure induced loads on the piston because of inability of the fluid to flow through the orifice defined by the grommet at a rate to allow the piston and cylinder assembly to function as an energy absorption device. Under certain extreme conditions, it is believed that as the bumper-mounted pistons move into their associated cylinders along the length of the tapered, stationary rod, the circumscribing grommets may in fact engage the rod and thereby be deformed and extruded into the cap aperture in such manner that the aperture is completely closed. When grommet collapse or limitation of fluid flow therethrough occurs, the system is no longer capable of any shock absorption whatsoever, and the full impact load is thus transmitted through the bumper to the vehicle frame.

It will be appreciated, however, that any proposed solution to the above problem must not interfere with the normal operation of the shock absorbing bumpers, and further must be entirely predictable in use and be relatively inexpensive. Thus, a bumper system having high impact shock absorption would be of little value if in accomplishing this goal shock absorption at low and moderate impact loads is destroyed or seriously impaired.

SUMMARY OF THE INVENTION

The present invention is broadly concerned with a fluid system of the type including walls defining a fluid chamber, and structure presenting an opening through one of the walls for passage of fluid therethrough in the event of a rise in fluid pressure within the chamber above a predetermined level. Such a system is greatly improved by provision of an integral, frangible, shear relief device separate from the one wall and located at least partially within the relief opening. The relief device includes a flange portion surrounding the opening and in engagement with the wall adjacent the latter, and a projecting portion extending into the opening. The juncture between the flange portion and projecting portion includes a sharp section (most preferably having a radius of no more than about 0.020 inches). Moreover, the radius of the corner of the wall opening adjacent the sharp section is greater than or equal to the radius of the sharp section, and both of these radii are less than the thickness of the flange.

The device is constructed and seated for shearing at the region of the juncture between the flange and projection, with consequent expulsion of the sheared portion of the device through the relief opening, upon experiencing a fluid pressure thereacross above a predetermined maximum. In order to provide controlled shearing of the projecting portion from the flange at a pressure within a relatively narrow range, the cross sectional area of the flange adjacent to the sharp section between the flange and projection is of predetermined thickness approximately equal to or less than that of the main body of the flange. This has the concomitant advantage of allowing provision of a flange of a thickness to assure resistance to substantial yield under high pressure thereagainst without a tendency to deform across an unsupported dimension of the same under such loads while the area of the flange at the sharp region is of a dimension such that complete shearing of the projecting portion from the flange portion occurs at the precise restricted pressure established as a specification for pressure relief before significant yield of the flange occurs. It is desired in this respect that the material of construction as well as the configuration of the device be chosen and correlated such that shearing of the projecting portion occurs before substantial yield of the flange.

In the case of a shock absorbing bumper of the type described above, the shear-type relief device hereof is located within each piston cap aperture in surrounding relationship to an associated flow-restricting tapered rod. In such orientation, the relief device is sheared thus providing a larger orifice for controlled flow of fluid therethrough when the bumper is subjected to a heavy impact, thus causing the piston and cylinder assemblies to function as energy absorbing devices.

The preferred relief device hereof is formed from machined metal, and most advantageously from so-called free machining brass. Other metals usable in this context include pure nickel, stainless steel, carbon steel, pure aluminum and certain aluminum alloys. In the case of metal materials, either work hardened or annealed metals may be employed. However, the shear and yield values of these metals vary from lot to lot and also with the degree of working or hardening which has been performed on the stock. Accordingly, the shear and yield values should be known for the particular stock employed and with these values in mind, the dimensions of the shearing device designed to assure that shear of the projecting portion occurs before significant yield of the flange. In some instances it may be desirable to provide a somewhat thinner cross sectional area of the flange at the juncture of shear to assure that shearing takes place before yield of the flange. Also, certain synthetic resin materials such as nylon, Dacron, Teflon, polyvinyl chloride and polyethylene materials may be used in certain instances.

The device is constructed of materials and dimensions such that the projecting portion breaks through itself so to speak at the zone of juncture of the projecting portion with the flange rather than breaking through another section of the flange which would make the supporting part and its dimensions critical to shearing.

In order to provide the most predictable shear properties, it is desirable that the juncture line between the flange and projection of the shear device be relatively sharp, and most preferably should have a radius of not more than about 0.010 inches. By the same token, the sharp juncture should extend about the entirety of the projection, although this is not absolutely necessary.

BRIEF DESCRIPTION OF THE DRAWINGS

FIG. 1 is a vertical sectional view illustrating one form of the pressure relief device of the present invention in association with a shock-absorbing bumper assembly, the latter being at rest;

FIG. 2 is a view similar to that of FIG. 1, but illustrates the configuration of the bumper assembly under mild impact;

FIG. 3 is an enlarged, fragmentary vertical sectional view illustrating the "bleed-through" action of hydraulic fluid during mild impact operation of the bumper assembly as depicted in FIG. 2;

FIG. 4 is a view similar to that of FIGS. 1 and 2, but illustrates the operation of the bumper assembly equipped with the shear-type relief device hereof under heavy impact;

FIG. 5 is a fragmentary vertical sectional view which further illustrates the shear-breaking action of the relief device hereof and the operation of the bumper assembly, as shown in FIG. 4;

FIG. 6 is a view similar to that of FIG. 5, but illustrates a conventional shock-absorbing bumper assembly under a heavy impact, and depicts the complete closure of the relief opening in that event;

FIG. 7 is an elevational view of the preferred shear-type relief device in accordance with the invention;

FIG. 8 is a side elevational view of the device depicted in FIG. 7;

FIG. 9 is an elevational view of the relief device, depicting the face thereof remote from that shown in FIG. 7;

FIG. 10 is a vertical sectional view taken along line 10—10 of FIG. 9;

FIG. 11 is an elevational view of a slidable, centrally apertured, rod-receiving piston cap forming a part of the overall shock-absorbing piston and cylinder bumper assembly illustrated in FIGS. 1, 2 and 4;

FIG. 12 is an essentially schematic side view of a pressure relief device in accordance with the invention.

FIG. 13 is a fragmentary vertical cross-sectional view similar to FIG. 2 but illustrating a modified form of the invention which is the preferred embodiment thereof and again illustrating the "bleed-through" action of hydraulic fluid through the pressure relief device during low pressures exerted against the shock-absorbing assembly;

FIG. 14 is an enlarged fragmentary vertical cross-sectional view through the cap of the piston and cylinder assembly mounting the pressure relief device therein and more particularly illustrating the limited flow of hydraulic fluid through the aperture of the relief device in surrounding relationship to the fluid control rod passing therethrough;

FIG. 15 is an enlarged fragmentary vertical cross-sectional view similar to FIG. 14 but illustrating the way in which the central portion of the relief device shears and provides a larger relief opening through the piston cap when high pressure forces are exerted on the relief device during severe impact loads;

FIG. 16 is a plan view of the piston cap illustrating the position of the relief device therein in accordance with this preferred embodiment of the invention;

FIG. 17 is a side elevational view of the pressure relief device as depicted in FIG. 18;

FIG. 18 is a rear view on an enlarged scale of the pressure relief device as illustrated in FIG. 16;

FIG. 19 is a cross-sectional view taken on the line 19—19 of FIG. 18 and looking in the direction of the arrows;

FIG. 20 is an essentially schematic partial fragmentary view of the relief device as shown in FIGS. 16-18 but illustrating only the left-hand side of the device for clarity of the constructional details thereof;

FIGS. 21-24, inclusive are enlarged fragmentary cross-sectional views similar to FIG. 20 but showing alternate embodiments of the preferred relief device; and FIG. 25 is an essentially schematic side view of pressure relief devices constructed in accordance with the alternate embodiments of FIGS. 21-24.

DESCRIPTION OF ONE PREFERRED EMBODIMENT

Turning now to the drawings, a shear-type pressure relief device 20 is illustrated in FIGS. 7-10. The device 20 is of integral construction and is preferably formed from machined brass or pure aluminum and includes a thin, annular flange portion 22 as well as an annular, relatively thick portion 24 terminating in a lip 26 of reduced thickness.

FIGS. 1-5 illustrate the use of device 20 in the context of a shock-absorbing bumper assembly 28. Broadly speaking, the assembly 28 includes a cylinder 30, a two-compartment tubular piston 32, a bumper 34, and a relief assembly 36 associated with piston 32.

In more detail, the cylinder 30 includes an elongated tubular body 38 having a rearmost planar endwall 40, and a beveled forward end 42. The cylinder 30 is fixedly secured to the frame 44 of a vehicle by means of a connector 46. It will be observed in this regard that the connector 46 further includes an elongated rod 48 which is centrally located within and extends along the length of the body 38. Further, the rod 48 terminates in a tapered forward end 50. Finally, the forward end of body 38 is supported by means of an annular mount 52.

Piston 32 includes an elongaged tubular member 54 with the forward end thereof welded to a plate 56. The plate 56 is in turn secured to bumper 34 by conventional means, whereas the rearward end of member 54 is telescoped within and is slidable relative to the cylinder 30. A cup-like slidable seal 58 is located within piston 32 intermediate the ends thereof. In this fashion, a forward chamber 60 is defined between seal 58 and plate 56, whereas a rearward chamber 62 is defined between the seal 58 and relief assembly 36. As is usual in bumper assemblies of this type, pressurized gas (usually nitrogen) is provided within the forward chamber 60, and may be at any suitable pressure, e.g. 150 psig.

Relief assembly 36 is in the form of an apertured, transversely extending metallic cap 64 which is affixed to the rearmost end of member 54 and slidably engages the inner surface of body 38. The central aperture 66 of cap 64 is defined by a continuous sidewall 68, as best seen in FIG. 3.

A relief unit 70 is interposed between sidewall 68 and the tapered end 50 of rod 48. The unit 70 includes shear relief device 20 as well as a tapered grommet 72. Again referring to FIG. 3, it will be seen that the flange portion 22 of the device 20 is in engagement with the rear surface of cap 64, whereas the projecting portion 24 extends through the opening 66 but does not significantly frictionally engage the side wall defining such opening or passage. Moreover, it will be observed that the lip 26 of device 20 is bent outwardly and engages the adjacent wall of cap 64, so as to hold the device 20 in place.

The grommet 72 is of metallic material and extends through the entirety of opening 66. It will further be noted that the taper of grommet 72 is opposite to that of the end 50.

Hydraulic fluid 74 is located within rearward chamber 62 of piston 32, and also within that portion of cylinder 30 between end cap 64 and wall 40. Communication between these regions is established and maintained through the opening 66, as will be readily apparent from a review of FIG. 1.

When the assembly 28 is at rest, it will be seen that the forward portion of tapered end 50 of rod 48 extends through opening 66, with equal pressure conditions being maintained in the chambers 60, 62.

In the event of a mild impact against bumper 28 (see FIGS. 2 and 3), the bumper 34 is moved rightwardly with the effect that piston 32 is shifted further into cylinder 30. By virtue of the essentially incompressible nature of the fluid 74, such fluid passes in a "bleed-through" fashion through the opening 66 between grommet 72 and end 50 (see FIG. 3). As the piston 32 moves further rightwardly, the effective area of the opening 66 is reduced, by virtue of the taper of end 50. This serves to progressively restrict flow of fluid 74 from cylinder 30 into chamber 62. As pressurized fluid enters the chamber 62, the seal 58 is moved leftwardly as viewed in FIG. 2 with the effect that the gas within chamber 60 is compressed. This combination of incompressible restricted fluid flow and further compression of the gaseous material gives a shock-absorbing effect which allows the impact energy to be absorbed safely and without damage to bumper 34.

In the case of a heavy impact against bumper 34 (see FIG. 4), the present invention operates to provide a measure of shock absorption not found in conventional bumper assemblies. Specifically, under such heavy impact conditions, the device 20 shears at the region of the juncture line between flange portion 22 and projecting portion 24. This ensures that communication between chamber 62 and the cylinder 30 is maintained so that shock absorption can continuously occur. The shear-type relief afforded through the use of device 20 is to be contrasted with prior bumper assemblies, and particularly the relief assemblies thereof as illustrated in FIG. 6. Specifically, such assemblies include only an apertured piston cap 64 and grommet 72, and as such provide no shear relief under heavy impact loads. To the contrary, under such loads the fluid flow permitted through the orifice of the grommet is at an inadequate rate to provide energy absorption by such flow. Also the grommet can under severe loads thereon engage the tapered end 50 of rod 48, with the effect that the grommet is deformed and in effect extruded into the opening 66. This results in virtually complete blockage of the communication between chamber 62 and cylinder 30, so that no fluid flow therebetween is permitted. Under these conditions, the overall piston and cylinder assembly loses all shock absorbing capability, and effectively provides only a solid, force-transmitting connection between bumper 34 and frame 44.

In order to provide the most advantageous shear relieving action, it has been determined that certain preferred relationships and dimensions should be provided in the device 20 and the supporting wall therefor. Referring specifically to FIG. 12, it will be seen that $D_1$ represents the diameter of the central aperture defined by the preferred device; $D_2$ represents the diameter of annular projection portion 24; $D_3$ represents the diameter of the wall opening 66; $D_4$ represents the diameter of the flange portion 22; T represents the thickness of flange portion 22; X represents the thickness of the overall device 20; y represents the distance between the outer surface of projecting portion 24 and the defining sidewall 68 of aperture 66; R represents the radius of the corner of the opening 66 adjacent the juncture line between the flange portion 22 and projecting portion 24; and R' represents the radius of the juncture line between the flange and projection portions 22, 24. In order to provide the most preferred and predictable shear relief results, it has been found that the minimum "X" dimension should be at least twice that of the "T" dimension; that $D_4$ should be greater than $D_3$ which should be greater than $D_2$ which should be greater than $D_1$; that y should be greater than O; that R should be greater than or equal to R'; that the minimum $D_4$ dimension should be equal to $D_3$ plus 2T plus 2R whereas the maximum $D_3$ dimension should be equal to $D_2$ *plus* 2y; that the maximum y distance should be equal to T minus R; and that R should be greater than or equal to R', and both of the latter should be less than T.

DESCRIPTION OF THE MOST PREFERRED EMBODIMENT

Referring initially to FIGS. 16–19, the preferred pressure relief device is broadly designated 120 and is similar to relief device 20 in that it is of integral construction and preferably formed from a material such as free-machining brass or pure aluminum. Here again though, the device may be fabricated of alternate equivalent materials such as those previously described. The annular flange portion 112 extending radially from the cylindrical, central projecting body portion 124 is somewhat thicker than the flange portion 22 of device 20. As will be explained in specific detail hereinafter, flange portion 122 is of a thickness such that its yield value is not exceeded before shearing occurs and thus serves as a stable platform for the annular or cylindrical projecting body portion 124 when different pressure loads are imposed on the device 120 prior to shearing of projecting portion 124 from flange portion 122. The body portion 124 terminates in an annular conical shaped lip 126 projecting away from flange 122 and is of substantially less cross-sectional thickness than the wall segment of annular body portion 124. As is apparent from FIGS. 16, 18 and 19, the body portion 124 has an axially extending passage 125 therethrough sized to receive the tapered end 50 of flow restriction rod 48 forming a part of the shock-absorbing bumper assembly.

In the embodiment of the invention illustrated in FIGS. 13–25, inclusive, pressure relief device 20 does not serve as a support for an orifice defining grommet 72 depicted in FIGS. 1–12, inclusive. Accordingly, since it is necessary that the pressure relief device 120 be shiftable laterally of metallic cap 64 to compensate for possible misalignment of the tapered end 50 of flow restricting rod 48 with the orifice defined by passage 125 in pressure relief device 120, the diameter of annular body portion 124 is dimensioned to assure a loose fit of the device 120 in the opening 165 of cap 64. An exemplary construction in this respect provides a space of about 0.025 in. between an adjacent segment of the surface 124a of body portion of 124 and a proximal wall section of cap 64 defining opening 165 therein. As a result, the total extent of the displacement of the device 120 in cap 64 is of the order of 0.05 in. The diameter of the passage 125 in pressure relief device 120 is similar to that of the aperture in grommet 72. In both instances such openings are related to the taper of end 50 of rod 48. As can be appreciated, the sizing of passage 125 relative to rod 48 is a function of the desired operating performance of the shock-absorbing bumper assembly and may be varied to meet different specifications and functional characteristics. The requirement is that fluid flow be adequate but controlled for low impact shock absorption but inadequate under high shock operation until the shear device functions to relieve fluid pressure therethrough.

When pressure relief device is mounted in cap 64, the lip 126 is deformed outwardly as illustrated in FIG. 14 to cause the device 120 to be trapped in the opening 165 of cap 64 but still allowing device 120 to shift laterally as necessary for alignment purposes with tapered end 50 of rod 48.

The schematic depiction of FIG. 12 applies equally to shear device 120 although it is to be understood that in view of the fact that no grommet is employed, the passage represented by $D_1$ of device 120 is substantially less than passage $D_1$ of device 20. As a consequence the space y $(D_3-D_2)$ must be substantially greater when device 120 is used than is the case with utilization of device 20 so that adequate shifting of device 120 in opening 165 is assured as previously indicated. By virtue of the reduced diameter of passage 125 providing more flange surface area exposed to fluid pressure and lesser flange support because of the need for compensation of the shifting of device 120 relative to cap 64, it is necessary that the flange 122 have a somewhat greater thickness T than the thickness of flange 22 to provide assurance that the yield value of the flange is not exceeded before the shear point is reached at the zone of juncture of projecting portion 124 with flange 122. The requirement that device 122 be movable in cap 64 and independently shiftable relative thereto makes it even more critical that the shape, dimensions and materials of fabrication be chosen, correlated and interrelated to assure that the shear value of the flange at the projecting portion thereof be reached so that the projecting portion 124 breaks free of the flange 122 independent of any supporting influence of the cap and before the flange 122 undergoes significant yield or shearing of the flange occurs at the zone where the flange is supported by the cap.

The operation of device 120 in use is similar to that previously described with respect to functioning of device 20. Thus, during absorption of low energy forces represented by low speed impact of a vehicle with an immovable object, hydraulic fluid flows through the passage 124 impeded only by the tapered end 50 of flow restriction rod 48. However, when the vehicle having shock absorption assembly 28 thereon impacts an object at relatively high speed thereby transmitting high pressure forces to the assembly, movement of rod 48 toward cap 64 is so rapid that flow of fluid through the passage 125 around tapered end 50 is limited to an extent that the pressure exerted on flange 122 of device 120 exceeds the shear resistance of the device across the section of flange 122 between the outer face 122a of flange 122 and the zone of merger of underface 122b with cylindrical surface 124a of body portion 124. As a consequence, the body portion 124 shears from the flange 122 as depicted in FIG. 15 thereby providing fluid relief for flow of fluid through the annular area between end 50 of rod 48 and the surface of cap 64 defining opening 165.

By virtue of the provision of a somewhat thicker flange 122, device 120 is stable under all conditions of forces imposed thereon and shearing of body portion 124 from flange 122 is positive and complete at a predetermined pressure level even though the device 120 may have shifted laterally somewhat in opening 165 by virtue of the fact that the axis of passage 125 may not be perfectly coaxial with the axis of opening 165.

Other preferred alternate embodiments of the invention are shown in schematic form in FIGS. 21 to 24 inclusive wherein again only the left portions of the device are actualy illustrated in a format similar to FIG. 20. These devices are broadly designated 220, 320, 420 and 520 respectively for FIGS. 21 to 24 inclusive and reference is first made to FIG. 21 wherein the underface 222b of flange portion 222 of device 220 merges with an inclined intermediate surface 222c extending inwardly of flange 222 and presenting a zone of juncture with the outer cylindrical surface 224a of body portion 224. The zone of juncture thus presented has a radius R' of minimum dimension as previously specified. For ease of machining, the inclined surface 222c may be at an angle of about 45° with respect to the planer surfaces of flange 222 perpendicular to the axis of body portion 224. Here again, body portion 224 has an axially extending passage 225 therethrough dimensioned to receive rod 48 using the same guidelines previously detailed where grommet 72 is not employed.

In the schematic depiction of device 220 in FIG. 25, the letters set forth are the same and have the same meaning as those of FIG. 12 with the exception of $T_s$ and $T'$. $T_s$ represents the distance between the outer face 222a of flange 222 and the proximal margin of cylindrical surface 224a defined by the zone of juncture of projecting body portion 224 and intermediate surface 222c. The dimension $T'$ in FIG. 25 is the total thickness of flange 222 and therefore is the part of the flange surrounding the segment thereof of reduced thickness $T_s$. In the schematic representation of device 220 in FIG. 20, the dimensional relationships set out in regard to device 20 as depicted in FIG. 12 apply equally to device 220 except: (i) it is to be understood that $T'$ is equal to or greater than $T_s$; (2) $T'$ is equal to or greater than y; (3) $R'$ should have a radius less than $T_s$; and (4) there is no critical requirement of the relationship of R to $T'$ or $T_s$ or to $R'$. y in FIG. 25 is the distance between the wall of cap 64 defining opening 165 and the cylindrical outer surface 124a of the body portion 124 of device 120.

FIGS. 22, 23 and 24 illustrate further alternate versions of the device as shown in FIGS. 21 and 25 in that the flange has a shear segment of reduced thickness directly aligned with the zone of merger of the underface of the flange with the outer annular surface of the projecting body portion integral therewith. In all instances, the somewhat thicker outer flange part of devices 320, 420 and 520 respectively may be provided while still leaving a limited cross section at the zone of merger of the outer face of a corresponding projecting body portion with the adjacent underface of a respective flange to assure shearing or break through of the body portion from each flange therefor at a selected predetermined pressure. For example, in FIG. 22, flange 322 may have a circular depression 322d therein to provide the desired relationship between $T'$ and $T_s$. In the flange 422 of FIG. 23, surface 422c is in the nature of a cross-sectional right angle face as contrasted with the 45° face 322c of the embodiment of FIG. 21. A further alternate construction is depicted in FIG. 24 wherein the upper face of 522c of flange 122''' is of generally conical configuration to provide the necessary relationship between $T'$ and $T_s$. In all instances, the flanges 322, 422 and 522 are of sufficient thickness to provide the required stability and resistance to yield before shearing occurs as previously discussed during functioning of devices 20 and 120, while at the same time allowing the cross-sectional area between the outer face of the flange and the adjacent edge of the projecting portion surfaces to be selectively determined and controlled during machining of corresponding devices. Also, in all instances the radius $R'$ between flange 222, 322, 422 and 522 and faces 224a, 324a, 424a and 524a respectively of body portion 224, 324, 424 and 524 should be maintained at a minimum (no more than about 0.020 in.) and preferably of the order of 0.010 in. as previously indicated.

Although the relief devices illustrated and described herein are of annular construction and are provided with a central aperture, the invention is not so limited; indeed, the relief devices may be of many different configurations depending upon desired end use, and specifically need not have a central aperture.

I claim:

1. In a fluid system of the type including walls defining a fluid chamber, and structure presenting an opening through one of said walls for passage of fluid therethrough in the event of a rise in fluid pressure within the chamber above a predetermined level, the improvement which comprises:

an integral, frangible, centrally apertured, shear relief device separated from said one wall and located at least partially within said opening and including a flange portion surrounding the opening and in engagement with the surface of said one wall adjacent said opening, and a projecting portion extending into said opening, the zone of juncture between said flange portion and projecting portion including a sharp section;

rod means extending through said aperture of said device for restricting the flow of fluid through said aperture, said one wall carrying the device thereon being shiftable along the length of the rod means; and said device being constructed and arranged in said one wall for expelling fluid through said opening upon experiencing a fluid pressure differential thereacross below a predetermined amount and for shearing at the region of said juncture with consequent expulsion of the sheared portion of the device through said opening, upon experiencing a fluid pressure differential thereacross above a predetermined amount.

2. The system as set forth in claim 1, wherein the radius of the zone of juncture of said flange with the projecting portion at said sharp section is substantially less than the thickness of the flange.

3. The system as set forth in claim 1 wherein the flange and projecting portion are of material and dimensions such that shearing of the projecting portion from the flange at a predetermined pressure occurs before the flange undergoes significant yield from such pressure.

4. The system as set forth in claim 1 wherein the thickness of the flange portion, the area of the flange portion exposed to fluid pressure in a direction toward the projecting portion, the material of construction and the distance between the projecting flange portion and the wall support for the device are coordinated and correlated such that shear of the projecting portion from the flange portion occurs at the sharp section at a pressure below that which significant yield of the flange occurs.

5. The system as set forth in claim 1 wherein the segment of the flange between said zone of juncture and the directly opposite outwardly facing surface of the flange is of a dimension to cause the projecting portion to shear from the flange at a relatively specific elevated pressure applied against the overall flange portion of the device in a direction toward the projecting portion thereof.

6. The system as set forth in claim 1 wherein said device is mounted on the one wall for lateral shifting relative thereto to an extent to allow the device to remain aligned with the rod means without binding thereon as the one wall is shifted by fluid pressure thereagainst, relative to the rod means.

7. The system as set forth in claim 6 wherein said projecting portion has a diameter sufficiently less than the diameter of the opening receiving the same to permit the device to shift laterally in said opening during application of fluid pressure against the device, said flange of the device being of sufficient thickness to preclude extrusion thereof through said opening regardless of the position of the device in the opening when pressure is applied to the device of a level to affect shearing of the projecting portion from said flange portion.

8. The system as set forth in claim 6 wherein the flange and projecting portion are constructed of material and dimensioned and configured such that shearing of the projecting portion from the flange occurs at said sharp section before shearing of the flange can occur before the flange is supported by said one wall regardless of the relative deposition of the device with respect to said one wall within the opening therein.

9. The system as set forth in claim 1 wherein the segment of the flange between said zone of juncture and the directly opposite outwardly facing surface of the flange is of less thickness than the part of the flange in surrounding relationship thereto.

10. The system as set forth in claim 9 wherein said part of the flange surrounding the segment thereof of reduced thickness is of a dimension to impart stability to the device during application of pressure thereagainst including forces applied at a level to effect shearing of projecting portion from the flange at said segment of the latter.

11. The system as set forth in claim 1 wherein the segment of the flange between said zone of juncture and the directly opposite outwardly facing surface of the flange is of lesser thickness than a part of the flange surrounding the segment, there being an intermediate surface joining the inwardly directed face of the flange to the proximal surface of said projecting portion at said zone of juncture, said intermediate surface being at an angle relative to the said inwardly directed face of the flange.

12. The system as set forth in claim 11 wherein said intermediate surface is at an angle of about 45° relative to the inwardly directed face of the flange.

13. The system as set forth in claim 11 wherein said intermediate surface defines essentially a right angle in cross section.

14. The system as set forth in claim 1 wherein the segment of the flange between said zone of juncture and the directly opposite outwardly facing surface of the flange is of lesser thickness than a part of the flange surrounding the segment, said flange having a conical depression in the outwardly facing surface thereof defining the outer boundary of said segment and the part of the flange, respectively.

15. The system as set forth in claim 1 wherein the corner of said opening adjacent the sharp section defined by said zone of juncture has a radius at least equal to the radius of the section both of said radii being less than the thickness of said flange.

16. The system as set forth in claim 1, said device being formed of brass.

17. The system as set forth in claim 1, said device being formed of aluminum.

18. The system as set forth in claim 1, the radius of said sharp section being not more than about 0.020 inches.

19. The system as set forth in claim 1, said radius being not more than about 0.010 inches.

20. The system as set forth in claim 1, said sharp section extending about the entirety of said projecting portion.

21. The system as set forth in claim 1, said projecting portion extending completely through said one wall.

22. The system as set forth in claim 1, said projecting portion including a radially outwardly extending connection lip of reduced thickness in engagement with the face of said one wall remote from said flange for maintaining said device in position on the one wall.

23. A shock absorbing assembly comprising:
an elongated, tubular cylinder;
means for securing said cylinder to a vehicle frame;
an elongated, tapered, stationary rod located within said cylinder;
an elongated, tubular piston telescoped within said cylinder, the end of said piston remote from said cylinder being secured to a bumper;
a slidable fluid-tight seal located within said piston intermediate the ends thereof;
a cap disposed across the end of said piston remote from said bumper and having structure defining an opening therein, said rod extending through said cap opening;
a relief unit interposed between the defining walls of said cap opening and said rod, including
a centrally apertured shear relief device including a flange portion surrounding said opening and in engagement with the surface of said cap remote from said bumper, and a projecting portion extending through said cap opening and circumscribing said rod in spaced adjacency, the juncture between said flange portion and projecting portion being sharp and having a radius of not more than about 0.020 inches; and
a tapered grommet located between the innermost surface of said projecting portion of said rod, said grommet extending through the entirety of said opening and being tapered in a direction opposite to the direction of taper of said rod.

* * * * *